United States Patent [19]

Pindar et al.

[11] 3,980,569

[45] Sept. 14, 1976

[54] DISPERSANTS AND PROCESS FOR THEIR PREPARATION

[75] Inventors: John Francis Pindar, Euclid; Jerome Martin Cohen, University Hts.; Charles Peterson Bryant, Euclid, all of Ohio

[73] Assignee: The Lubrizol Corporation, Cleveland, Ohio

[22] Filed: Jan. 13, 1975

[21] Appl. No.: 540,470

Related U.S. Application Data

[63] Continuation-in-part of Ser. No. 451,644, March 15, 1974, abandoned.

[52] U.S. Cl............................... 252/51.5 R; 44/75
[51] Int. Cl.²..................... C10M 1/32; C10M 3/26; C10L 1/22
[58] Field of Search.................... 252/51.5 R; 44/75

[56] References Cited
UNITED STATES PATENTS

| | | | |
|---|---|---|---|
| 2,962,442 | 11/1960 | Andress | 252/51.5 R |
| 3,737,465 | 6/1973 | Karll et al. | 252/51.5 R |

*Primary Examiner*—Delbert E. Gantz
*Assistant Examiner*—I. Vaughn
*Attorney, Agent or Firm*—James W. Adams, Jr. and Daniel N. Hall

[57] ABSTRACT

Compositions useful as lubricant and fuel dispersants are prepared by reacting a hydroxyaromatic compound containing an aliphatic or alicyclic substituent which has at least about 6 carbon atoms with an aldehyde in the presence of an alkaline reagent and at a temperature up to about 125°C., substantially neutralizing the resulting intermediate at a temperature up to about 150°C., and then reacting with a primary or secondary amino compound.

28 Claims, No Drawings

DISPERSANTS AND PROCESS FOR THEIR PREPARATION

REFERENCE TO RELATED APPLICATIONS

This application is a continuation-in-part of copending application Ser. No. 451,644, filed Mar. 15, 1974 now abandoned.

This invention relates to a new chemical process, and to compositions prepared by that process which are useful in lubricants and fuels. More particularly, it relates to a method for preparing an oil-soluble nitrogen-containing composition of matter which comprises:

1. reacting at least one hydroxyaromatic compound containing an aliphatic or alicyclic substituent of at least about 6 carbon atoms with at least one aldehyde or precursor thereof in the presence of an alkaline reagent, at a temperature up to about 125°C.; then 2. substantially neutralizing the intermediate thus formed at a temperature up to about 150°C.; and then 3. reacting the neutralized intermediate with at least one amino compound which contains one or more amino groups having at least one hydrogen atom directly bonded to amino nitrogen.

The Mannich reaction between active hydrogen compounds, formaldehyde and compounds containing amino groups has been known for some time. It is also known (e.g., from U.S. Pat. Nos. 3,368,972 and 3,649,229) that Mannich bases derived from certain alkylphenols function as dispersants in lubricants and fuels. The preparation of such Mannich bases is described in U.S. Pat. No. 3,737,465.

In view of the increasingly severe conditions under which internal combustion engines are operated, it is of continuing interest to prepare more effective dispersant additives. Due to financial considerations, raw material supplies, and other factors, it is also desirable to develop alternate dispersants and methods for their preparation.

A principal object of the present invention, therefore, is to provide a new method for producing lubricant and fuel additives.

A further object is to provide an improved method for producing compositions useful in lubricants and fuels.

Still another object is to provide improved additives for use in lubricants and fuels, concentrates containing these additives, and improved lubricant and fuel compositions containing said additives.

These and other objects can be achieved according to the description of the invention provided hereafter.

According to this invention, an oil-soluble nitrogen-containing compositions, useful as additives in lubricants and fuels, are prepared from three reagents by means of a specific reaction sequence discussed herein.

The first reagent is a hydroxyaromatic compound. This term includes phenols (which are preferred); carbon-, oxygen-, sulfur- and nitrogen-bridged phenols and the like as well as phenols directly linked through covalent bonds (e.g., 4,4'-bis(hydroxy)biphenyl), hydroxy compounds derived from fused-ring hydrocarbon (e.g., naphthols and the like); and polyhydroxy compounds such as catechol, resorcinol and hydroquinone. Mixtures of one or more hydroxyaromatic compounds can be used as the first reagent.

The hydroxyaromatic compounds used in the method of this invention are those substituted with at least one, and preferably not more than two, aliphatic or alicyclic substituents having at least about 6 (usually at least about 30, more preferably at least 50) carbon atoms and up to about 7000 carbon atoms. Examples of such substituents derived from the polymerization of olefins such as ethylene, propylene, 1-butene, 2-butene, isobutene and the like. Both homopolymers (made from a single olefin monomer) and interpolymers (made from two or more of olefin monomers) can serve as sources of these substituents and are encompassed in the term "polymers" as used herein and in the appended claims. Substituents derived from polymers of ethylene, propylene, 1-butene and isobutene are preferred, especially those containing at least about 30 and preferably at least about 50 aliphatic carbon atoms. In some instances, however, higher molecular weight substituents, e.g., those having molecular weights of about 50,000–100,000, are desirable since such substituents can impart viscosity index improving properties to the composition. Such higher molecular weights can be calculated from the inherent or intrinsic viscosity using the Mark-Houwink equation and are called viscosity average molecular weights ($\overline{M}v$). Number average molecular weights ($\overline{M}n$) ranging from about 420 to 10,000 are conveniently measured by vapor pressure osmometry (VPO). (And this method is used for the $\overline{M}n$ ranges set forth herein.)

The aliphatic and alicyclic substituents as well as the aryl nuclei of the hydroxyaromatic compound are generally described as "hydrocarbon-based" substituents.

As used herein, the term "hydrocarbon-based substituent" denotes a substituent having a carbon atom directly attached to the remainder of the molecule and having predominantly hydrocarbyl character within the context of this invention. Such substituents include the following:

1. Hydrocarbon substituents, that is aliphatic (e.g., alkyl or alkenyl), alicyclic (e.g., cycloalkyl or cycloalkenyl) substituents, aromatic, aliphatic- and alicyclic-substituted aromatic nuclei and the like, as well as cyclic substituents wherein a ring is completed through another portion of the molecule (that is, any two indicated substituents may together form an alicyclic radical).

2. Substituted hydrocarbon substituents, that is, those containing non-hydrocarbon radicals which, in the context of this invention, do not alter the predominantly hydrocarbyl character of the substituent. Those skilled in the art will be aware of suitable radicals (e.g., hydroxy, halo, (especially chloro and fluoro), alkoxyl, mercapto, alkyl mercapto, nitro, nitroso, sulfoxy, etc., radicals.).

3. Hetero substituents, that is, substituents which, while predominantly hydrocarbon in character within the context of this invention, contain atoms other than carbon present in a chain or ring otherwise composed of carbon atoms. Suitable hetero atoms will be apparent to those skilled in the art and include, for example, sulfur, oxygen and nitrogen and form substituents such as, e.g., pyridyl, furanyl, thiophenyl, imidazolyl, etc.

In general, no more than about three radicals or hetero atoms, and preferably no more than one, will be present for each 5 carbon atoms in the hydrocarbon-based substituent. Preferably, there will be no more than three radicals per 10 carbon atoms.

Preferably, the hydrocarbon-based substituent in the compositions of this invention are free from acetylenic unsaturation. Ethylenic unsaturation, when present, preferably will be such that no more than one ethylenic linkage will be present for every 10 carbon-to-carbon bonds in the substituent. The substituents are usually preferably hydrocarbon in nature and more preferably, substantially saturated hydrocarbon. As used in this specification and the appended claims, the word "lower" denotes substituents, etc. containing up to seven carbon atoms; for example, lower alkoxy, lower alkyl, lower alkenyl, lower aliphatic aldehyde.

Introduction of the aliphatic or alicyclic substituent onto the phenol or other hydroxyaromatic compound is usually effected by mixing a hydrocarbon (or a halogenated derivative thereof, or the like) and the phenol at a temperature of about 50°–200°C. in the presence of a suitable catalyst, such as aluminum trichloride, boron trifluoride, zinc chloride or the like. See, for example, U.S. Pat. No. 3,368,972 which is incorporated by reference for its disclosures in this regard. This substituent can also be introduced by other alkylation processes known in the art.

Especially preferred as the first reagent are monosubstituted phenols of the general formula

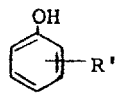

wherein R is an aliphatic or alicyclic hydrocarbon-based substituent of $\overline{M}n$ (V.P.O.) of about 420 to about 10,000.

The second reagent is a hydrocarbon-based aldehyde, preferably a lower aliphatic aldehyde. Suitable aldehydes include formaldehyde, benzaldehyde, acetaldehyde, the butyraldehydes, hydroxybutyraldehydes and heptanals, as well as aldehyde precursors which react as aldehydes under the conditions of the reaction such as paraformaldehyde, hexamethylene tetraamine, paraldehyde, formalin and methal. Formaldehyde and its polymers (e.g., paraformaldehyde, trioxane) are preferred. Mixtures of aldehydes may be used as the second reagent.

The third reagent is a compound containing an amino group having at least one hydrogen atom directly bonded to amino nitrogen. Suitable amino compounds are those containing only primary, only secondary, or both primary and secondary amino groups, as well as polyamines in which all but one of the amino groups may be tertiary. Suitable amino compounds include ammonia, aliphatic amines, aromatic amines, heterocyclic amines and carbocyclic amines, as well as polyamines such as alkylene amines, arylene amines, cyclic polyamines and the hydroxy-substituted derivatives of such polyamines. Mixtures of one or more amino compounds can be used as the third reagent.

Specific amines of these types are methylamine, N-methylethylamine, N-methyl-octylamine, N-cyclohexyl-aniline, dibutylamine, cyclohexylamine, aniline, di(p-methyl-phenyl)amine, ortho, meta and para-aminophenol, dodecylamine, octadecylamine, o-phenylene-diamine, N,N'-di-n-butyl-p-phenylenediamine, morpholine, N,N-di-n-butyl-n-phenylenediamine, piperazine, tetrahydropyrazine, indole, hexahydro-1,3,5-triazine, 1-H-1,2,4-triazole, bis-(p-aminophenyl)-methane, menthanediamine, cyclohexamine, pyrrolidine, 3-amino-5,6-diphenyl-1,2,4-triazine, quinonediimine, 1,3-indandiimine, 2-octadecyl-imidazoline, 2-phenyl-4-methylimidazolidine, oxazolidine, ethanolamine, diethanolamine, N-3-aminopropyl morpholine, phenothiazine, 2-heptyl-oxazolidine, 2-heptyl-3-(2-aminopropyl)imidazoline, 4-methyl-imidazoline, 1,3-bis(2-aminoethyl)imidazoline, 2-heptadecyl-4-(2-hydroxyethyl)imidazoline and pyrimidine.

A preferred group of amino compounds consists of polyamines, especially alkylene polyamines conforming for the most part to the formula

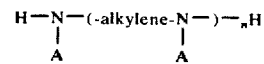

wherein n is an integer preferably less than about 10, A is a hydrocarbon-based substituent or hydrogen atom, and the alkylene radical is preferably a lower alkylene radical of up to 7 carbon atoms. Mixtures of such polyamines are similarly useful. The alkylene polyamines include principally polymethylene amines, ethylene amines, butylene amines, propylene amines, trimethylene amines, pentylene amines, hexylene amines, heptylene amines, octylene amines, other polymethylene amines, and also the cyclic and the higher homologs of such amines such as piperazines and aminoalkylsubstituted piperazines. They are exemplified specifically by: ethylene diamine, triethylene tetramine, propylene diamine, decamethylene diamine, octamethylene diamine, di(heptamethylene)triamine, tripropylene tetramine, tetraethylene pentamine, trimethylene diamine, pentaethylene hexamine, di(trimethylene)triamine, 1-(2-aminopropyl)piperazine, 1,4-bis(2-aminoethyl)-piperazine, and 2-methyl-1-(2-aminobutyl)piperazine. Higher homologs such as are obtained by condensing two or more of the above illustrated alkylene amines likewise are useful.

The ethylene polyamines are especially useful. They are described in some detail under the heading "Diamines and Higher Amines" in "Encyclopedia of Chemical Technology", Second Edition, Kirk and Othmer, Volume 7, pages 27–39, Interscience Publishers, New York (1965). Such compounds are prepared most conveniently by the reaction of an alkylene chloride with ammonia. The reaction results in the production of somewhat complex mixtures of alkylene polyamines, including cyclic condensation products such as piperazines. These mixtures find use in the process of this invention. On the other hand, quite satisfactory products may be obtained also by the use of pure alkylene polyamines. An especially useful alkylene polyamine for reasons of economy as well as effectiveness of the products derived therefrom is a mixture of ethylene amines prepared by the reaction of ethylene chloride and ammonia and containing about 3–7 amino groups per molecule.

Hydroxyalkyl-substituted alkylene polyamines, i.e., alkylene polyamines having one or more hydroxyalkyl substituents on the nitrogen atoms, likewise are contemplated for use herein. The hydroxyalkyl-substituted alkylene polyamines are preferably those in which the alkyl group is a lower alkyl group, i.e., an alkyl having less than 8 carbon atoms. Examples of such amines include N-(2-hydroxyethyl)ethylene diamine, N,N'-bis(2-hydroxyethyl)ethylene diamine, 1-(2-hydroxyethyl)piperazine, mono-hydroxypropyl-substituted diethylene triamine, 1,4-bis(2-hydroxypropyl)piperazine, dihydroxypropyl-substituted tetraethylene pentamine, N-(3-hydroxypropyl)tetramethylene diamine, etc.

Higher homologs such as are obtained by condensation of the above-illustrated alkylene polyamines or hydroxyalkylsubstituted alkylene polyamines through amino radicals or through hydroxy radicals are likewise useful. It will be appreciated that condensation through amino radicals results in a higher amine accompanied with removal of ammonia and that condensation through the hydroxy radicals results in products containing ether linkages accompanied with removal of water.

Another preferred class of amino compounds are aromatic amines containing about 6 to about 30 carbon atoms and at least one primary or secondary amino-groups. groups, Examples include aryl amines such as the isomeric amino phenols, aniline, N-lower alkyl anilines, heterocyclic amines such as the isomeric amino pyridines, the isomeric naphthyl amines, phenothiazine, and their $C_{1-30}$ hydrocarbyl substituted analogs such as N-phenyl-alpha-naphthyl amine. Aromatic diamines such as the phenylene and naphthylene diamines can also be used.

Other suitable amino compounds include ureas, thioureas, hydroxylamines, hydrazines, quanidines, amidines, amides, thioamides, cyanamides, amino acids and the like. Specific examples illustrating such compounds are: hydrazine, phenylhydrazine, N,N'-diphenylhydrazine, octadecylhydrazine, benzoylhydrazine, urea, thiourea, N-butylurea, stearylamide, oleylamide, guanidine, 1-phenylguanidine, benzamidine, octadecamidine, N,N'-dimethylstearamidine, cyanamide, dicyandiamide, guanylurea, aminoguanidine, iminodiacetic acid, iminodipropionitrile, etc.

In the first step of the method of this invention, the hydroxyaromatic compound is reacted with the aldehyde in the presence of an alkaline reagent, at a temperature up to about 125°C. and preferably about 50°–125°C.

The alkaline reagent is typically a strong inorganic base such as an alkali metal based (e.g., sodium or potassium hydroxide). Other inorganic and organic bases can be used as the alkaline base such as $Na_2CO_3$, $NaHCO_3$, sodium acetate, pyridine, and hydrocarbon-based amines such as methylamine, aniline, and alkylene polyamines, etc.) may also be used. Mixtures of one or more alkaline bases may be used.

The relative proportions of the various reagents employed in the first step are not critical; it is generally satisfactory to use about 1–4 equivalents of aldehyde and about 0.05–10.0 equivalents of alkaline reagent per equivalent of hydroxyaromatic compound. (As used herein, the term "equivalent" when applied to a hydroxyaromatic compound indicates a weight equal to the molecular weight thereof divided by the number of aromatic hydroxyl groups directly bonded to an aromatic ring per molecule. As applied to the aldehyde or precursors thereof, an "equivalent" is the weight required to produce one more molecule of monomeric aldehyde. An equivalent of alkaline reagent is that weight of reagent that when dissolved in one liter of solvent will give a normal solution. One equivalent of alkaline reagent will neutralize (i.e., bring up pH 7.0) a 1.0 normal solution of, e.g., hydrochloric or sulfuric acid).

It is generally convenient to carry out the first step in the presence of a substantially inert, organic liquid diluent, which may be volatile or non-volatile. A substantially inert, organic liquid diluent which may or may not dissolve all the reactants, is a material which does not substantially react with the reagents under the reaction conditions. Suitable diluents include hydrocarbons such as naphtha, textile spirits, mineral oil (which is preferred), synthetic oils (as described hereinbelow), benzene, toluene and xylene; alcohols such as isopropanol, n-butanol, isobutanol and 2-ethylhexanol; ethers such as ethylene or diethylene glycol mono- or diethyl ether; or the like, as well as mixtures thereof.

The second step is the substantial neutralization of the intermediate obtained in the first step: Neutralization may be effected with any suitable acidic material, typically a mineral acid or an organic acid or anhydride. Acidic gases such as carbon dioxide, hydrogen sulfide, and sulfur dioxide may also be used. Preferably neutralization is accomplished with carboxylic acids, especially lower hydrocarbon-based carboxylic acid such as formic, acetic or butyric acid. Mixtures of one or more acidic materials can be used to accomplish neutralization. The temperature of neutralization is up to about 150°C., preferably about 50°–150°C. Substantial neutralization means the reaction mixture is brought to a pH ranging between about 4.5 and 8.0. Preferably, the reaction mixture is brought to a minimum pH of about 6 or a maximum of about 7.5.

The neutralized intermediate is a mixture comprising hydroxyalkyl derivatives of the hydroxyaromatic compound and ether condensation products thereof. Thus, the condensation product of an alkylphenol with formaldehyde has the general structure

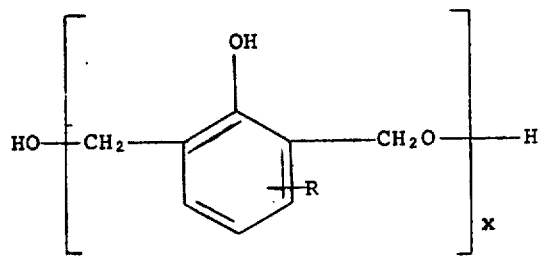

wherein R is the hereinbefore-described aliphatic or alicyclic hydrocarbon-based substituent of about 6 to about 7000 carbon atoms and x is an integer of about 1 to 10. Preferably R has an $\overline{M}n$ (V.P.O.) of about 420 to about 10,000. If a strong acid such as a mineral acid is used for neutralization, it is important to regulate the amount thereof present so as not to bring the reaction mixture to a lower pH than that specified hereinabove, in order to avoid overcondensation to form methylene-bridged phenols rather than an intermediate containing ether oxygens. However, carboxylic acids such as acetic acid do not readily promote overcondensation and it is therefore unnecessary to regulate so closely the amount of carboxylic acid used.

In the third step, the neutralized intermediate is reacted with the amino compound, typically at a temperature between about 25°C. and about 225°C. and usually about 55°–180°C. The ratio of reactants in the third step is not critical but about 1–6 equivalents of amine reactant are generally employed per equivalent of the neutralized intermediate. (The equivalent weight of the amine is the molecular weight thereof divided by the number of hydrogens bonded to nitrogen atoms present per molecule and the equivalent weight of the neutralized intermediate is its molecular weight divided by the number of hydroxyl groups derived from the aldehyde.) It is frequently convenient to use a substantially inert liquid diluent, typically the same one used in the first step.

The course of the reaction between the neutralized intermediate and the amine may be determined by measuring the amount of water removed by distillation, azeotropic distillation or the like. When water evolution has ceased, the reaction may be considered complete and any solids present may be removed from the mixture by conventional means; e.g., filtration, centrifugation, or the like, affording the desired product. It is ordinarily unnecessary to otherwise isolate the product from the reaction mixture or purify it.

The method of this invention is illustrated by the following examples. All parts are by weight and all molecular weights are determined by V.P.O unless otherwise indicated.

EXAMPLE 1

A mixture of 1560 parts (1.5 equivalents) of a polyisobutylphenol having a molecular weight of about 885, 1179 parts of mineral oil and 99 parts of n-butyl alcohol is heated to 80°C. under nitrogen, with stirring, and 12 parts (0.15 equivalent) of 50% aqueous sodium hydroxide solution is added. The mixture is stirred for 10 minutes and 99 parts (3 equivalents) of paraformaldehyde is added. The mixture is stirred at 80°-88°C. for 1.75 hours and is then neutralized by the addition of 9 parts (0.15 equivalent) of acetic acid.

To the intermediate thus obtained is added at 88°C., with stirring, 172 parts (4.2 equivalents) of a commercial polyethylene polyamine mixture containing about 3-7 nitrogen atoms per molecule and about 34.5% by weight nitrogen. The mixture is heated over about 2 hours to 150°C. and stirred at 150°-160°C. for 3 hours, with volatile material being removed by distillation. The remainder of the volatiles are then stripped at 160°C./30 torr, and the residue is filtered at 150°C., using a commercial filter aid material, to yield the desired product as a filtrate in the form of 60% solution in mineral oil containing 1.95% nitrogen.

EXAMPLE 2

A solution of 4576 parts (4.4 equivalents) of the polyisobutylphenol of Example 1 in 3226 parts of mineral oil is heated to 55°C. under nitrogen, with stirring, and 18 parts (0.22 equivalent) of 50% aqueous sodium hydroxide solution is added. The mixture is stirred for 10 minutes and then 320 parts (9.68 equivalents) of paraformaldehyde is added. The mixture is heated at 70°-80°C. for 13 hours, and is then cooled to 60°C. whereupon 20 parts (0.33 equivalent) of acetic acid is added. The mixture is then heated at 110°C. for 6 hours while being blown with nitrogen to remove volatile materials. Nitrogen blowing is continued at 130°C. for an additional 6 hours, after which the solution is filtered at 120°C., using a filter aid material.

To the above alkylphenol-fomaldehyde concentrate, at 65°C., is added 184 parts (4.48 equivalents) of the polyethylene polyamine of Example 1. The mixture is heated at 110°-135°C. over 4 hours and is then blown with nitrogen at 150°-160°C. for 5 hours as volatiles are removed. Mineral oil, 104 parts, is added and the mixture is filtered at 150°C., using a filter aid material, to yield the desired product as a 60% solution in mineral oil containing 1.80% nitrogen.

EXAMPLE 3

To 366 parts (0.2 equivalent) of the alkylphenolformaldehyde condensate of Example 2 is added at 60°C., with stirring, 43.4 parts (0.3 equivalent) of N-(3-aminopropyl)morpholine. The mixture is heated at 110°-130°C., with nitrogen blowing, for 5 hours. It is then stripped of volatiles at 170°C./16 torr, and filtered using a filter aid material. The filtrate is the desired product (62.6% solution in mineral oil) containing 1.41% nitrogen.

EXAMPLE 4

Following the procedure of Example 3, a reaction product is prepared from 366 parts (0.2 equivalent) of the alkylphenol-formaldehyde condensate of Example 2 and 31.5 parts (0.3 equivalent) of diethanolamine. It is obtained as a 62.9% solution in mineral oil, containing 0.70% nitrogen.

EXAMPLE 5

A mixture of 2600 parts (2.5 equivalents) of the polyisobutylphenol of Example 2, 750 parts of textile spirits and 20 parts (0.25 equivalent) of 50% aqueous sodium hydroxide is heated to 55°C. under nitrogen, with stirring, and 206 parts (6.25 equivalents) of paraformaldehyde is added. Heating at 50°-55°C., with stirring, is continued for 21 hours after which the solution is blown with nitrogen and heated to 85°C. as volatile materials are removed. Acetic acid 22 parts (0.37 equivalent), is fumarate, over ½ hour at 85°-90°C., followed by 693 parts of mineral oil.

To 315 parts (0.231 equivalent) of the alkylphenol-formaldehyde intermediate prepared as described above is added under nitrogen, at 65°C., 26.5 parts (0.647 equivalent) of the polyethylene polyamine mixture of Example 1. The mixture is heated at 65°-90°C. for about 1 hour, and is then heated to 120°-130°C. with nitrogen blowing, and finally to 145°-155°C. with continued nitrogen blowing for 3½ hours. Mineral oil, 57 parts, is added and the solution is filtered at 120°C., using a filter aid material. The filtrate is the desired product (69.3% solution in mineral oil) containing 2.11% nitrogen.

EXAMPLE 6

A solution of 340 parts (0.25 equivalent) of the alkylphenol-formaldehyde condensation product of Example 5 in 128 parts of mineral oil is heated to 45°C. and 30 parts (0.25 equivalent) of tris-(methylol)methylamine is added, with stirring. The mixture is heated to 90°C. over ½ hour, and is then blown with nitrogen at 90°-130°C. for 3 hours, with stirring. Finally, it is heated to 150°-160°C. for 5 hours, with nitrogen blowing, cooled to 125°C. and filtered, using a filter aid material. The filtrate is the desired product (60% solution in mineral oil) containing 0.19% nitrogen.

EXAMPLE 7

To a mixture of 1560 parts (1.5 equivalents) of the polyisobutylphenol of Example 2 and 12 parts (0.15 equivalent) of 50% aqueous sodium hydroxide solution is added at 68°C., with stirring, 99 parts (3 equivalents) of paraformaldehyde. The addition period is 15 minutes. The mixture is then heated to 88°C. and 100 parts of a mixture of isobutyl and primary amyl alcohols is added. Heating at 85°-88°C. is continued for 2 hours and then 16 parts of glacial acetic acid is added and the mixture is stirred for 15 minutes and vacuum stripped at 150°C. To the residue is added 535 parts of mineral oil, and the oil solution is filtered to yield the desired intermediate.

To 220 parts (0.15 equivalent) of the intermediate prepared as described above is added 7.5 parts (0.15 equivalent) of hydrazine hydrate. The mixture is heated to 80°–105°C. and stirred at that temperature for 4 hours. Acetic acid, 0.9 part, is then added and stirring is continued at 95°–125°C. for an additional 6 hours. A further 7.5-part portion of hydrazine hydrate is added and heating and stirring are continued for 8 hours, after which the product is stripped of volatiles under vacuum at 124°C. and 115 parts of mineral oil is added. Upon filtration, the desired product (50% solution in mineral oil) is obtained; it contains 1.19% nitrogen.

EXAMPLE 8

A mixture of 6240 parts (6 equivalents) of the polyisobutylphenol of Example 2 and 2814 parts of mineral oil is heated to 60°C. and 40 parts (0.5 equivalent) of 50% aqueous sodium hydroxide solution is added, with stirring. The mixture is stirred for ½ hour at 60°C., and 435 parts (13.2 equivalents) of 91% aqueous formaldehyde solution is added at 75°–77°C. over 1 hour. Stirring at this temperature is continued for 10 hours, after which the mixture is neutralized with 30 parts of acetic acid and stripped of volatile materials. The residue is filtered, using a filter aid material.

A mixture of 629 parts (0.4 equivalent) of the resulting intermediate and 34 parts (0.4 equivalent) of dicyandiamide is heated to 210°C. under nitrogen, with stirring, and maintained at 210°–215°C. for 4 hours. It is then filtered through a filter aid material and the filtrate is the desired product (71% solution in mineral oil) containing 1.04% nitrogen.

EXAMPLE 9

A mixture of 1792 parts (1.6 equivalents) of the polyisobutylphenol of Example 2 and 1350 parts of xylene is heated to 60°C. and 12.8 parts (0.16 equivalent) of 50% aqueous sodium hydroxide solution is added, with stirring. The mixture is stirred at 60°–65°C. for 10 minutes, and then 108 parts (3.28 equivalents) of paraformaldehyde is added. Heating is continued at 65°–75°C. for 5 hours, after which 14.3 parts (0.24 equivalent) of acetic acid is added. The acidified mixture is heated at 75°–125°C. for ½ hour and then stripped under vacuum. The resulting intermediate solution is filtered through a filter aid material.

To 2734 parts (1.4 equivalents) of the above-described intermediate, maintained at 65°C., is added 160.7 parts (3.92 equivalents) of the polyethylene polyamine of Example 1. The mixture is heated for 1½ hours at 65°–110°C. and for 1½ hours at 110°–140°C., after which heating at 140°C. is continued with nitrogen blowing for 11 hours, while a xylene-water azeotrope is collected by distillation. The residual liquid is filtered at 100°C., using a filter aid material, and the filtrate is the desired product (60% solution in xylene) containing 1.79% nitrogen.

EXAMPLE 10

A mixture of 3740 parts (2 equivalents) of a polyisobutylphenol in which the polyisobutene substituent has a molecular weight of about 1600, 1250 parts of textile spirits and 2000 parts of isopropyl alcohol is stirred and 352 parts (2.2 equivalents) of 50% aqueous sodium hydroxide solution is added, followed by 480 parts (6 equivalents) of 38% aqueous formaldehyde solution. The mixture is stirred for 2 hours, allowed to stand for 2 days and then stirred again for 17 hours. Acetic acid, 150 parts (2.5 equivalents) is added and the mixture is stripped of volatile materials under vacuum. The remaining water is removed by adding benzene and azeotropically distilling; during the distillation, 1000 parts of mineral oil is added in 2 portions. The residue is filtered through a filter aid material to yield the desired intermediate.

To 430 parts (0.115 equivalent) of the intermediate, at 90°C., is added with stirring 14.1 parts (0.345 equivalent) of the polyethylene polyamine of Example 1. The mixture is heated at 90°–120°C. for 2 hours and then at 150°–160°C. for 4 hours, with nitrogen blowing. After all volatile materials have been removed, the resulting solution is filtered to yield the desired product (52% solution in mineral oil) which contains 1.03% nitrogen.

EXAMPLE 11

A solution of 6650 parts (25 equivalents) of tetrapropylphenol in 2000 parts of toluene is heated to 55°C. with stirring, and 200 parts (2.5 equivalents) of 50% aqueous sodium hydroxide solution is added, followed by 1820 parts (55 equivalents) of paraformaldehyde (over 15 minutes). During the paraformaldehyde addition, the temperature rises to 100°C. It is blown with nitrogen and cooled to 85°C., whereupon 150 parts of acetic acid is added. Water is removed by azeotropic distillation and the remaining product is filtered through a filter aid material.

A mixture of 555 parts (1.5 equivalents) of the intermediate thus obtained, 300 parts of isopropyl alcohol, 100 parts of xylene and 270 parts (3 equivalents) of guanidine carbonate is heated under reflux for 12 hours. Xylene, 200 parts, is then added and volatiles are removed by distilling at 110°C. The mixture is filtered and the solids are washed with xylene; the combined filtrate and washings are vacuum stripped and 600 parts of mineral oil is added. Stripping of volatile materials continued and the remaining liquid is filtered through a filter aid material. The filtrate is the desired product (48% solution in mineral oil) which contains 3.17% nitrogen.

EXAMPLE 12

A tetrapropylphenol-formaldehyde intermediate is prepared by a method similar to that described in Example 11. A mixture of 393 parts (1 equivalent) of that intermediate, 168 parts (2 equivalents) of dicyandiamide, 250 parts of isopropyl alcohol and 458 parts of mineral oil is heated to reflux and maintained at that room temperature for about 9 hours. Volatiles are then removed by vacuum stripping and the residual liquid is filtered using a filter aid material. The filtrate is the desired product (50% solution in mineral oil) containing 4.41% nitrogen.

EXAMPLE 13

A mixture of 393 parts (1 equivalent) of the tetrapropylphenol-formaldehyde intermediate of Example 12, 318 parts (1.63 equivalents) of disodium iminodiacetate and 400 parts of xylene is heated under reflux for about 18 hours and is then filtered. The desired product is obtained as the filtrate (45% solution in xylene) and contains 0.04% nitrogen.

EXAMPLE 14

A mixture of 131 parts (0.33 equivalent) of the tetrapropylphenol-formaldehyde intermediate of Example 12, 41 parts (1 equivalent) of 3,3-iminodipropionitrile and 200 parts of xylene is heated at 120°–130°C. for 6½ hours and is then stripped of volatile materials under vacuum. The residual liquid is filtered through a filter aid material and the material on the filter is washed with 200 parts of xylene. The combined filtrate and washings are concentrated to yield an 86% solution in xylene of the desired product, containing 8.60% nitrogen.

EXAMPLE 15

The tetrapropylphenol-formaldehyde intermediate of Example 12 (589 parts, 1.5 equivalents) is heated to 62°C. and 324 parts (4 equivalents) of aminopropyldiethanolamine is added over 1 hour at 62°–89°C. The mixture is heated for 1 hour at 89°–120°C. and is then blown with nitrogen as water is removed by azeotropic distillation. The residual liquid is heated at 140°–162°C. for 5 hours as additional water is removed, and is then cooled and 200 parts of xylene is added. The liquid is filtered, using a filter aid material, and the filtrate is the desired product (71% solution in xylene) containing 5.76% nitrogen.

EXAMPLE 16

A mixture 2989 parts (7 equivalents) of a polyisobutylphenol in which the polyisobutyl substituent has a molecular weight of about 330, 56 parts (0.7 equivalent) of 50% aqueous sodium hydroxide solution and 1000 parts of toluene is heated to 65°C. and 254 parts (7.7 equivalents) of paraformaldehyde is added. The mixture is heated with stirring at 65°–85°C. for about 1 hour, and an additional 254 parts (7.7 equivalents) of paraformaldehyde is added. Heating is continued at 69°–76°C. for 2 hours, whereupon 42 parts (0.7 equivalent) of acetic acid is added. Volatile materials are then removed by azeotropic distillation under vacuum and the remaining liquid is filtered through a filter aid material.

To 457 parts (1.5 equivalents) of the intermediate thus obtained is added 162 parts (2 equivalents) of aminopropyldiethanolamine. The mixture is heated under reflux, with azeotropic removal of water, for about 2 hours and then at 140°–160°C. for about 8 hours. It is then cooled to 130°C. and 165 parts of mineral oil is added. The remaining toluene is removed by distillation and the residual liquid is filtered. The filtrate is the desired product (75% solution in mineral oil) and contains 4.16% nitrogen.

Examples 17 to 20 describe the preparation of intermediates for preparing dispersants of this invention and are carried out, with variations noted in Table A by the following procedure: A mixture of the polybutyl-substituted phenol, mineral oil, n-butanol, sodium hydroxide and paraformaldehyde is heated at 82°–87°C. for 3 hours. Glacial acetic acid is then added and stirred for ½ hour to provide a mixture containing the desired intermediate. These intermediates are converted to the desired dispersants by the means described in Examples 21–28.

TABLE A

| EXAMPLE No. | Polybutyl-substituted Phenol | | Paraformaldehyde Parts by Wt. | Sodium Hydroxide eq. | Solvent | | Acetic Acid eq. |
|---|---|---|---|---|---|---|---|
| | Mn(VPO) | Parts by Wt. | | | n-butanol Parts by Wt. | Mineral Oil Parts by Wt. | |
| 17 | 1340 | 850 | 35 | 0.053 | 35 | 614 | 0.053 |
| 18 | 920 | 4200 | 231 | 0.35 | 231 | 2400 | 0.35 |
| 19 | 960 | 520 | 33 | 0.05 | 33 | 412 | 0.05 |
| 20 | 1300 | 960 | 39.6 | 0.06 | 40 | 729 | 0.06 |

EXAMPLE 21

The intermediate prepared in Example 17 is heated to 120°C. and 58 parts of o-aminophenol added. The reaction mixture is heated at 115°–140°C. for 2 hours, then stripped to 160°C. under vacuum and filtered. The filtrate is the desired product (60% solution in mineral oil, containing 0.30% nitrogen).

EXAMPLE 22

The intermediate prepared in Example 18 is stripped to 100°C. under vacuum and filtered to yield 6430 parts of a 65% oil solution of intermediate.

EXAMPLE 23

The intermediate prepared in Example 22, 970 parts, is heated to 75°C. and 69 parts of sulfanilic acid is added. The mixture is heated at 160°–200°C. for 11 hours as water is removed while blowing with nitrogen. The mixture is filtered at 150°C. to yield the desired product (65% solution in mineral oil).

EXAMPLE 24

The intermediate prepared in Example 22, 970 parts, 75 parts of n-butanol and 30 parts of glycine is heated at 170°–175°C. for 11 hours as distillate is removed while blowing with nitrogen. The mixture is filtered to yield the desired product (65% oil solution, containing 0.24% nitrogen).

EXAMPLE 25

The intermediate prepared in Example 17 is heated to 120°C. and 56.3 parts of aniline is added. The reaction mixture is heated at 155°–180°C. for 8 hours, then stripped to 190°C. under vacuum and filtered to yield the desired product (60% solution in mineral oil, containing 0.34% nitrogen).

EXAMPLE 26

The intermediate prepared in Example 17 is heated at 125°C. for 1.5 hours as distillate is removed while blowing with nitrogen. The reaction mixture is cooled to 70°C., and 180 parts of p-aminophenol and 75 parts of n-butanol is added. The mixture is heated at 148°C. for 3 hours and water is removed by azeotropic distillation, then stripped to 160°C. under vacuum and filtered. The filtrate is the product which contains 40% mineral oil and 0.32% nitrogen.

EXAMPLE 27

The intermediate prepared in Example 19 is heated to 85°C. and 84.5 parts of diphenylamine is added. The reaction mixture is heated at 150°–160°C. for 4 hours and water is removed by azeotropic distillation, then stripped to 160°C. under vacuum. The mixture is filtered to yield the desired product (60% solution in mineral oil, containing 0.52% nitrogen).

EXAMPLE 28

The intermediate prepared in Example 20 is heated at 120°C. for 1.5 hours as water is removed by a Dean-Stark trap while blowing with nitrogen. Phenothiazine, 119 parts, is added and heated at 150°–170°C. for 5 hours, then stripped at 170°C. under vacuum. The mixture is filtered to yield the desired product (60% solution in mineral oil, which contains 0.43% nitrogen and 1.07% sulfur.)

As previously indicated, the compositions of this invention are useful as additives for lubricants, in which they function primarily as sludge dispersants and detergents. Such dispersants and detergents disperse and remove from surfaces sludge which forms in the lubricant during use. They can be employed in a variety of lubricants based on diverse oils of lubricating viscosity, including natural and synthetic lubricating oils and mixtures thereof. These lubricants include crankcase lubricating oils for spark-ignited and compression-ignited internal combustion engines, such as automobile and trucks engines, two-cycle engines, aviation piston engines, marine and railroad diesel engines, and the like. They can also be used in gas engines, jet aircraft turbines, stationary power engines and turbines and the like. Automatic transmission fluids, transaxle lubricants, gear lubricants, metal-working lubricants, hydraulic fluids and other lubricating oil and grease compositions can also benefit from the incorporation therein of the compositions of the present invention.

Natural oils include animal oils and vegetable oils (e.g., castor oil, lard oil) as well as mineral lubricating oils such as liquid petroleum oils and solvent-treated or acid-treated mineral lubricating oils of the paraffinic, naphthenic or mixed paraffinic-napthenic types. Oils of lubricating viscosity derived from coal or shale are also useful base oils. Synthetic lubricating oils include hydrocarbon oils and halosubstituted hydrocarbon oils such as polymerized and interpolymerized olefins (e.g., polybutylenes, polypropylenes, propylene-isobutylene copolymers, chlorinated polybutylenes, etc.); poly(1-hexenes), poly(1-octenes), poly(1-decenes), etc. and mixtures thereof; alkylbenzenes (e.g., dodecylbenzenes, tetradecylbenzenes, dinonylbenzenes, di-(2-ethylhexyl)-benzenes, etc.); polyphenyls (e.g., biphenyls, terphenyls, alkylated polyphenyls, etc.); alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc. constitute another class of known synthetic lubricating oils. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of 1000, diphenyl ether of polyethylene glycol having a molecular weight of 500–1000, diethyl ether of polypropylene glycol having a molecular weight of 1000–1500, etc.) or mono-and polycarboxylic esters thereof, for example, the acetic acid esters, mixed $C_3$-$C_8$ fatty acid esters, or the $C_{13}$Oxo acid diester of tetraethylene glycol.

Another suitable class of synthetic lubricating oils comprises the esters of dicarboxylic acids (e.g., phthalic acid, succinic acid, alkyl succinic acids, alkenyl succinic acids, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.). Specific examples of these esters include dibutyl adipate, di(2-ethylhexyl)-sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include those made from $C_5$ to $C_{12}$ monocarboxylic acids and polyols and polyol ethers such as neopentyl glycol, trimethylol propane, pentaerythritol, dipentaerythritol, tripentaerythritol, etc.

Silicon-based oils such as the polyalkyl-, polyaryl-, polyalkoxy-, or polyaryloxy-siloxane oils and silicate oils comprise another useful class of synthetic lubricants (e.g., tetraethyl silicate, tetraisopropyl silicate, tetra-(2-ethylhexyl)silicate, tetra-(4-methyl-hexyl)silicate, tetra-(p-tert-butylphenyl)silicate, hexyl-(4-methyl-2-pentoxy)disiloxane, poly(methyl)siloxanes, poly(methylphenyl)siloxanes, etc.). Other synthetic lubricating oils include liquid esters of phosphorus-containing acids (e.g., tricresyl phosphate, trioctyl phosphate, diethyl ester of decane phosphonic acid, etc.), polymeric tetrahydrofurans and the like.

Unrefined, refined and rerefined oils, either natural or synthetic (as well as mixtures of two or more of any of these) of the type disclosed hereinabove can be used in the lubricant compositions of the present invention. Unrefined oils are those obtained directly from a natural or synthetic source without further purification treatment. For example, a shale oil obtained directly from retorting operations, a petroleum oil obtained directly from primary distillation or ester oil obtained directly from an esterification process and used without further treatment would be an unrefined oil. Refined oils are similar to the unrefined oils except they have been further treated in one or more purification steps to improve one or more properties. Many such purification techniques are known to those of skill in the art such as solvent extraction, secondary distillation, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed to removal of spent additives and oil breakdown products.

In general, about 0.05–20.0 parts (by weight) of the composition of this invention is dissolved or stably dispersed in 100 parts of oil to produce a satisfactory lubricant. The invention also contemplates the use of other additives in combination with the composition of this invention. Such additives include, for example, auxiliary detergents and dispersants of the ash-producing or ashless type, oxidation inhibiting agents, pour point depressing agents, extreme pressure agents, color stabilizers and anti-foam agents.

The ash-producing detergents are exemplified by oil-soluble neutral and basic salts of alkali or alkaline earth metals with sulfonic acids, carboxylic acids, or organic phosphorus acids characterized by at least one direct carbon-to-phosphorus linkage such as those prepared by the treatment of an olefin polymer (e.g., polyisobutene having a molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium and barium.

The term "basic salt" is used to designate metal salts wherein the metal is present in stoichiometrically larger amounts than the organic acid radical. The commonly employed methods for preparing the basic salts involve heating a mineral oil solution of an acid with a stoichiometric excess of a metal neutralizing agent such as the metal oxide, hydroxide, carbonate, bicarbonate, or sulfide at a temperature above 50°C. and filtering the resulting mass. The use of a "promoter" in the neutralization step to aid the incorporation of a large excess of metal likewise is known. Examples of compounds useful as the promoter include phenolic substances such as phenol, naphthol, $C_{6-26}$ alkylphenols, thiophenol, sulfurized alkylphenol, and condensation products of formaldehyde with a phenolic substance; $C_{1-20}$ alcohols such as methanol, 2-propanol, octyl alcohol, cellosolve, carbitol, ethylene glycol, stearyl alcohol, and cyclohexyl alcohol; and $C_{1-20}$ amines such as aniline, phenylenediamine, phenothiazine, phenyl-b-naphthylamine, and dodecylamine. A particularly effective method for preparing the basic salts comprises mixing an acid with an excess of a basic alkaline earth metal neutralizing agent and at least one alcohol promoter, and carbonating the mixture at an elevated temperature such as 60°-200°C.

Ashless detergents and dispersants are so called despite the fact that, depending on its constitution, the dispersant may upon combustion yield a non-volatile material such as boric oxide or phosphorus pentoxide; however, it does not ordinarily contain metal and therefore does not yield a metal-containing ash on combustion. Many types are known in the art, and any of them are suitable for use in the lubricants of this invention. The following are illustrative:

1. Reaction products of carboxylic acids (or derivatives thereof) containing at least about 34 and preferably at least about 54 carbon atoms with nitrogen-containing compounds such as amines, organic hydroxy compounds such as phenols and alcohols, and/or basic inorganic materials. Examples of these "carboxylic dispersants" are described in British Patent 1,306,529 and in many U.S. Patents, including the following:

| | | |
|---|---|---|
| 3,163,603 | 3,351,552 | 3,541,012 |
| 3,184,474 | 3,381,022 | 3,542,678 |
| 3,215,707 | 3,399,141 | 3,542,680 |
| 3,219,666 | 3,415,750 | 3,567,637 |
| 3,271,310 | 3,433,744 | 3,574,101 |
| 3,272,746 | 3,444,170 | 3,576,743 |
| 3,281,357 | 3,448,048 | 3,630,904 |
| 3,306,908 | 3,448,049 | 3,632,510 |
| 3,311,558 | 3,451,933 | 3,632,511 |
| 3,316,177 | 3,454,607 | 3,697,428 |
| 3,340,281 | 3,467,668 | 3,725,441 |
| 3,341,542 | 3,501,405 | Re 26,433 |
| 3,346,493 | 3,522,179 | |

2. Reaction products of relatively high molecular weight aliphatic or alicyclic halides with amines, preferably polyalkylene polyamines. These may be characterized as "amine dispersants" and examples thereof are described, for example, in the following U.S. Patents:

| | |
|---|---|
| 3,275,554 | 3,454,555 |
| 3,438,757 | 3,565,804 |

3. Products obtained by post-treating the carboxylic or amine dispersants with such reagents as urea, thiourea, carbon disulfide, aldehydes, ketones, carboxylic acids, hydrocarbon-substituted succinic anhydrides, nitriles, epoxides, boron compounds, phosphorus compounds or the like. Exemplary materials of this kind are described in the following U.S. Patents:

| | | |
|---|---|---|
| 3,036,003 | 3,367,943 | 3,579,450 |
| 3,087,936 | 3,373,111 | 3,591,598 |
| 3,200,107 | 3,403,102 | 3,600,372 |
| 3,216,936 | 3,442,808 | 3,639,242 |
| 3,254,025 | 3,455,831 | 3,649,229 |
| 3,256,185 | 3,455,832 | 3,649,659 |
| 3,278,550 | 3,493,520 | 3,658,836 |
| 3,280,234 | 3,502,677 | 3,697,574 |
| 3,281,428 | 3,513,093 | 3,702,757 |
| 3,282,955 | 3,533,945 | 3,703,536 |
| 3,312,619 | 3,539,633 | 3,704,308 |
| 3,366,569 | 3,573,010 | 3,708,522 |

4. Interpolymers of oil-solubilizing monomers such as decyl methacrylate, vinyl decyl ether and high molecular weight olefins with monomers containing polar substituents, e.g., aminoalkyl acrylates or acrylamides and poly-(oxyethylene)-substituted acrylates. These may be characterized as "polymeric dispersants" and examples thereof are disclosed in the following U.S. Patents:

| | |
|---|---|
| 3,329,658 | 3,666,730 |
| 3,449,250 | 3,687,849 |
| 3,519,565 | 3,702,300 |

The pertinent disclosures of all of the above-noted patents are incorporated by reference herein.

Extreme pressure agents and corrosion-inhibiting and oxidation-inhibiting agents are exemplified by chlorinated aliphatic hydrocarbons such as chlorinated wax; organic sulfides and polysulfides such as benzyl disulfide, bis(chlorobenzyl)disulfide, dibutyl tetrasulfide, sulfurized methyl ester of oleic acid, sulfurized alkylphenol, sulfurized dipentene, and sulfurized terpene; phosphosulfurized hydrocarbons such as the reaction product of a phosphorus sulfide with turpentine or methyl oleate; phosphorus esters including principally dihydrocarbon and trihydrocarbon phosphites such as dibutyl phosphite, diheptyl phosphite, dicyclohexyl phosphite, pentyl phenyl phosphite, dipentyl phenyl phosphite, tridecyl phosphite, distearyl phosphite, dimethyl naphthyl phosphite, oleyl 4-pentylphenyl phosphite, polypropylene (molecular weight 500)-substituted phenyl phosphite, diisobutyl-substituted phenyl phosphite; metal thiocarbamates, such as zinc dioctyldithiocarbamate, and barium heptylphenyl dithiocarbamate; Group II metal phosphorodithioates such as zinc dicyclohexylphosphorodithioate, zinc dioctylphosphorodithioate, barium di(heptylphenyl)-phosphorodithioate, cadmium dinonylphosphorodithioate, and the zinc salt of a phosphorodithioic acid produced by the reaction of phosphorus pentasulfide with an equimolar mixture of isopropyl alcohol and n-hexyl alcohol.

The fuel compositions of the present invention contain a major proportion of a normally liquid fuel, usually a hydrocarbonaceous petroleum distillate fuel such as aviation or motor gasoline as defined by ASTM Specification D-439-73 and diesel fuel or fuel oil as defined by ASTM Specification D-396. Normally liquid fuel compositions comprising nonhydrocarbonaceous materials such as alcohols, ethers, organo-nitro compounds and the like (e.g., methanol, ethanol, diethyl ether, methyl ethyl ether, nitromethane) are also within the scope of this invention as are liquid fuels derived from vegetable or mineral sources such as corn, alfalfa, shale and coal. Normally liquid fuels which are mixtures of one or more hydrocarbonaceous fuels and one or more non-hydrocarbonaceous materials are also contemplated. Examples of such mixtures are combinations of gasoline and ethanol, diesel fuel and ether, gasoline and nitromethane, etc. Particularly preferred is gasoline, that is, a mixture of hydrocarbons having an ASTM boiling point of 60°C. at the 10% distillation point to about 205°C. at the 90% distillation point.

Generally, these fuel compositions contain an amount of the compositions of this invention sufficient to impart dispersant and detergent properties to the fuel; usually this amount is about 1 to about 10,000 preferably 4 to 1,000 parts by weight of the reaction product per million parts by weight of fuel. The preferred gasoline-based fuel compositions generally exhibit excellent engine oil sludge dispersancy and detergency properties. In addition, they exhibit anti-rust and carburetor/fuel line deposit-removing and deposit-inhibiting properties.

The fuel compositions of this invention can contain, in addition to the compositions of this invention, other additives which are well known to those of skill in the art. These can include anti-knock agents such as tetraalkyl lead compounds, lead scavengers such as haloalkanes (e.g., ethylene dichloride and ethylene dibromide), deposit preventors or modifiers such as triaryl phosphates, dyes, cetane improvers, anti-oxidants such as 2,6-di-tertiarybutyl-4-methylphenol, rust inhibitors, such as alkylated succinic acids and anhydrides, bacteriostatic agents, gum inhibitors, metal deactivators, demulsifiers, upper cylinder lubricants, anti-icing agents and the like.

In certain preferred fuel compositions of the present invention, the afore-described compositions of this invention are combined with other ashless dispersants in gasoline. Such ashless dispersants are preferably esters of a mono- or polyol and a high molecular weight mono- or polycarboxylic acid acylating agent containing at least 30 carbon atoms in the acyl moiety. Such esters are well known to those of skill in the art. See, for example, French Patent 1,396,645, British Patents 981,850 and 1,055,337 and U.S. Pat. Nos. 3,255,108; 3,311,558; 3,331,776; 3,346,354; 3,522,179; 3,579,450; 3,542,680; 3,381,022; 3,639,242; 3,697,428; 3,708,522; and British Patent Specification 1,306,529. These patents are expressly incorporated herein by reference for their disclosure of suitable esters and methods for their preparation. Generally, the weight ratio of the compositions of this invention to the aforesaid ashless dispersants is about 0.1 to about 10.0; preferably about 1 to about 10 parts of composition of this invention to 1 part ashless dispersant.

In still another embodiment of this invention, the inventive additives are combined with Mannich condensation products formed from substituted phenols, aldehydes, polyamines, and amino pyridines. Such condensation products are described in U.S. Pat. Nos. 3,649,659; 3,558,743; 3,539,633; 3,704,308; and 3,725,277.

The compositions of this invention can be added directly to the fuel or lubricating oil to form the fuel and lubricant compositions of this invention or they can be diluted with a substantially inert, normally liquid organic solvent/diluent such as mineral oil, xylene, or a normally liquid fuel as described above, to form an additive concentrate which is then added to the fuel or lubricating oil in sufficient amounts to form the inventive fuel and lubricant composition described herein. These concentrates generally contain about 20 to about 90 percent of the composition of this invention and can contain in addition any of the above-described conventional additives, particularly the aforedescribed ashless dispersants in the aforesaid proportions. The remainder of the concentrate is the solvent/diluent.

Typical fuel and lubricating compositions of this invention are listed in Tables I and II, respectively. Except for the values for mineral oil and for the products of Examples 2, 5, 7, 9 and 11, all amounts are exclusive of mineral oil used as diluent. In Table I, amounts are in parts by weight per million parts of gasoline.

TABLE I

| Ingredient | Parts by weight per million parts gasoline | | |
|---|---|---|---|
| | Fuel | A | B |
| Product of Example 5 | | 98 | — |
| Product of Example 9 | | — | 150 |
| Tretolite proprietary demulsifier composition | | — | 2 |
| Exxon proprietary demulsifier composition | | — | 4 |
| Nalco proprietary demulsifier composition | | — | 2 |
| Xylene | | — | 74 |
| Isooctyl alcohol | | — | 49 |

TABLE II

| Ingredient | Parts by weight | | |
|---|---|---|---|
| | Lubricant C | D | E |
| Mineral Oil (SAE 10W-40 base) | 78.18 | — | 80.08 |
| Mineral Oil (SAE 30 base) | — | 90.69 | — |
| Product of Example 2 | 4.44 | — | — |
| Product of Example 7 | — | 5.00 | — |
| Product of Example 11 | — | — | 2.00 |
| Polyisobutenyl succinic anhydride-polyethylene polyamine reaction product | — | — | 1.89 |
| Polyisobutenyl succinic anhydride-polyethylene polyamine-boric acid reaction product | 2.04 | — | — |

TABLE II-continued

| Ingredient | Lubricant | Parts by weight | | |
|---|---|---|---|---|
| | | C | D | E |
| Pentaerythritol ester of poly-isobutenyl succinic acid | | — | — | 1.77 |
| Basic calcium petroleum sulfonate | | — | 0.57 | — |
| Basic calcium salt of alkyl-phenol sulfide | | — | 1.69 | — |
| Zinc tetrapropenylphenylphos-phorodithioate | | — | 2.05 | — |
| Tetrapropenylsuccinic acid | | 0.34 | — | — |
| Reaction product of alkylphenol, formaldehyde and dimer-captothiadiazole | | 0.49 | — | — |
| Sulfurized Diels-Alder adduct | | 1.33 | — | 1.31 |
| 2,6-Di-t-butyl-p-cresol | | 0.03 | — | 0.03 |
| Hindered phenol antioxidant | | 0.32 | — | — |
| Ethylene-propylene-diene terpolymer | | 12.49 | — | 12.57 |
| Vinyl carboxylate-vinyl ether-dialkyl fumarate terpolymer | | 0.34 | — | 0.35 |
| Silicone anti-foam agent | | 0.006 | 0.01 | 0.004 |

What is claimed is:

1. A lubricating composition comprising a major amount of a lubricating oil and a minor amount of a nitrogen-containing composition made by the method which comprises
   1. reacting at least one hydroxyaromatic compound containing an aliphatic or alicyclic substituent of at least about six carbon atoms with at least one aldehyde or precursor thereof in the presence of an alkaline reagent, at a temperature up to about 125°C.; then
   2. substantially neutralizing the intermediate thus formed at a temperature up to about 150°C.; and then
   3. reacting the neutralized intermediate with at least one amino compound which contains one or more amino groups having hydrogen directly bonded to amino nitrogen.

2. A lubricating composition as claimed in claim 1 wherein the hydroxyaromatic compound is a phenol, the aldehyde is formaldehyde or a precursor thereof, the temperature of step (1) is about 50°–125°C., and the temperature of step (2) is about 50°–150°C.

3. A lubricating composition as claimed in claim 2 wherein the substituent on the phenol is an aliphatic substituent having at least about 30 carbon atoms.

4. A lubricating composition as claimed in claim 3 wherein the amino compound is alkylene polyamine.

5. A lubricating composition as claimed in claim 4 wherein the substituent on the phenol contains at least about 50 aliphatic carbon atoms and is derived from a polymer of propylene, 1-butene or isobutene.

6. A lubricating composition as claimed in claim 5 wherein the alkylene polyamine is ethylene polyamine.

7. A lubricating composition as claimed in claim 6 wherein the substituent on the phenol is derived from polymerized isobutene.

8. A lubricating composition as claimed in claim 1 wherein the amino compound is aromatic amine containing about six to about 30 carbon atoms.

9. A lubricating composition as claimed in claim 3 wherein the amino compound is aromatic amine containing about 6 to about 30 carbon atoms.

10. A lubricating composition as claimed in claim 9 wherein the substituent on the phenol contains at least about 50 aliphatic carbon atoms and is derived from a polymer of propylene, 1-butene or isobutene.

11. A lubricating composition as claimed in claim 1 wherein the oil is a mineral oil.

12. A lubricating composition as claimed in claim 1 wherein the oil is a synthetic oil.

13. A fuel composition comprising a major amount of a normally liquid fuel and a minor amount of a nitrogen-containing composition made by the method which comprises
   1. reacting at least one hydroxyaromatic compound containing an aliphatic or alicyclic substituent of at least about six carbon atoms with at least one aldehyde or precursor thereof in the presence of an alkaline reagent, at a temperature up to about 125°C.; then
   2. substantially neutralizing the intermediate thus formed at a temperature up to about 150°C.; and then
   3. reacting the neutralized intermediate with at least one amino compound which contains one or more amino groups having hydrogen directly bonded to amino nitrogen.

14. A fuel composition as claimed in claim 13 wherein the hydroxyaromatic compound is a phenol, the aldehyde is formaldehyde or a precursor thereof, the temperature of step (1) is about 50°–125°C., and the temperature of step (2) is about 50°–150°C.

15. A fuel composition as claimed in claim 14 wherein the substituent on the phenol is an aliphatic substituent having at least about 30 carbon atoms.

16. A fuel composition as claimed in claim 15 wherein the amino compound is alkylene polyamine.

17. A fuel composition as claimed in claim 16 wherein the substituent on the phenol contains at least about 50 aliphatic carbon atoms and is derived from a polymer of propylene, 1-butene or isobutene.

18. A fuel composition as claimed in claim 17 wherein the alkylene polyamine is ethylene polyamine.

19. A fuel composition as claimed in claim 18 wherein the substituent on the phenol is derived from polymerized isobutene.

20. A fuel composition as claimed in claim 13 wherein the amino compound is aromatic amine containing about six to about 30 carbon atoms.

21. A fuel composition as claimed in claim 15 wherein the amino compound is aromatic amine containing about 6 to about 30 carbon atoms.

22. A fuel composition as claimed in claim 21 wherein the substituent on the phenol contains at least about 50 aliphatic carbon atoms and is derived from a polymer of propylene, 1-butene or isobutene.

23. A fuel composition as claimed in claim 13 wherein the fuel is a petroleum distillate fuel.

24. An additive concentrate comprising about 20–90% by weight of a nitrogen-containing composition made by the method which comprises
   1. reacting at least one hydroxyaromatic compound containing an aliphatic or alicyclic substituent of at least about six carbon atoms with at least one aldehyde or precursor thereof in the presence of an alkaline reagent, at a temperature up to about 125°C.; then
   2. substantially neutralizing the intermediate thus formed at a temperature up to about 150°C.; and then
   3. reacting the neutralized intermediate with at least one amino compound which contains one or more amino groups having hydrogen directly bonded to amino nitrogen.

25. An additive concentrate as claimed in claim 24 wherein the hydroxyaromatic compound is a phenol having an aliphatic substituent of at least about 30 carbon atoms, the aldehyde is formaldehyde or a precursor thereof, the temperature of step (1) is about 50°–125°C., and the temperature of step (2) is about 50°–150°C.

26. An additive concentrate as claimed in claim 25 wherein the amino compound is an alkylene polyamine, and the substituent on the phenol contains at least about 50 aliphatic carbon atoms and is derived from a polymer of propylene, 1-butene or isobutene.

27. An additive concentrate as claimed in claim 25 wherein the amino compound is an ethylene polyamine and the aliphatic substituent of the phenol contains at least about 50 aliphatic carbon atoms and is derived from polymerized isobutene.

28. An additive concentrate as claimed in claim 24 wherein the hydroxyaromatic compound is a phenol, the aldehyde is formaldehyde or a precursor thereof, the temperature of step (1) is about 50°–125°C., and the temperature of step (2) is about 50°–150°C.

* * * * *